US009988034B2

(12) United States Patent
Hericher

(10) Patent No.: US 9,988,034 B2
(45) Date of Patent: Jun. 5, 2018

(54) SPRING BRAKE CYLINDER WITH EMERGENCY RELEASE DEVICE

(71) Applicant: KNORR-BREMSE Systeme Fuer Nutzfahrzeuge GmbH, Munich (DE)

(72) Inventor: Stephane Hericher, Basseneville (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days. days.

(21) Appl. No.: 15/193,763

(22) Filed: Jun. 27, 2016

(65) Prior Publication Data

US 2016/0304073 A1 Oct. 20, 2016

Related U.S. Application Data

(63) Continuation of application No. PCT/EP2014/078627, filed on Dec. 19, 2014.

(30) Foreign Application Priority Data

Dec. 27, 2013 (DE) .................. 10 2013 114 897

(51) Int. Cl.
*B60T 17/08* (2006.01)
*F16D 65/28* (2006.01)
(Continued)

(52) U.S. Cl.
CPC .......... *B60T 17/086* (2013.01); *B60T 17/083* (2013.01); *F16D 65/28* (2013.01);
(Continued)

(58) Field of Classification Search
CPC ..... B60T 17/086; B60T 17/083; B60T 17/085
(Continued)

(56) References Cited

U.S. PATENT DOCUMENTS 3,101,219 A * 8/1963 Herrera ................ B60T 17/086
188/170
3,630,093 A * 12/1971 Morse .................. B60T 17/086
188/170
(Continued)

FOREIGN PATENT DOCUMENTS

CN 1789750 A 6/2006
CN 101610940 A 12/2009
(Continued)

OTHER PUBLICATIONS

International Preliminary Report on Patentability (PCT/IB/338 & PCT/IB/373) issued in PCT Application No. PCT/EP2014/078627, including English translation of Written Opinion (PCT/ISA/237) dated Jul. 7, 2016 (fifteen (15) pages).
(Continued)

*Primary Examiner* — Thomas J Williams
(74) *Attorney, Agent, or Firm* — Crowell & Moring LLP

(57) ABSTRACT

A pneumatic spring brake cylinder is provided for brake systems of vehicles, including a housing in which a spring brake piston loaded by an accumulator spring and connected to a spring brake piston tube is guided in a movable manner, and an emergency release device for the emergency release of the spring brake piston in the event of a drop in pressure. The emergency release device contains a spindle which can be rotated relative to the spring brake cylinder and which can be screwed in a nut that is held in a rotationally fixed manner in the spring brake piston tube by a form-fitting connection. The nut interacts with an axial stop on the spring brake piston in order to trigger a release movement against the effect of the accumulator spring. The formfitting connection is formed between an outer polygonal profiled section of the outer circumference of the nut in a circumferential direction and a complementary circumferential inner polygonal profiled section on the inner circumference of an intermediate
(Continued)

bushing and between an outer polygonal profiled section of the outer circumference of the intermediate bushing in the circumferential direction and a complementary circumferential inner polygonal profiled section on the inner circumference of the spring brake piston tube.

14 Claims, 3 Drawing Sheets

(51) Int. Cl.
- *F16D 121/12* (2012.01)
- *F16D 123/00* (2012.01)
- *F16D 127/04* (2012.01)
- *F16D 125/06* (2012.01)

(52) U.S. Cl.
CPC ..... *B60T 2270/403* (2013.01); *F16D 2121/12* (2013.01); *F16D 2123/00* (2013.01); *F16D 2125/06* (2013.01); *F16D 2127/04* (2013.01)

(58) Field of Classification Search
USPC .......... 188/72.3, 166, 106 F, 106 P, 170; 303/9.76; 92/63
See application file for complete search history.

(56) References Cited

U.S. PATENT DOCUMENTS

| | | | |
|---|---|---|---|
| 3,782,251 A | 1/1974 | Le Marchand | |
| 3,977,304 A * | 8/1976 | Meissner | B60T 17/086 188/170 |
| 3,994,205 A | 11/1976 | Ekdahl et al. | |
| 5,632,192 A | 5/1997 | Plantan et al. | |
| 5,697,474 A | 12/1997 | Antony et al. | |
| 6,360,649 B1 * | 3/2002 | Plantan | B60T 17/085 92/99 |
| 8,789,664 B2 | 7/2014 | Fantazi et al. | |
| 2004/0060784 A1 * | 4/2004 | Gravier | F15B 15/10 188/170 |
| 2006/0131116 A1 | 6/2006 | Plantan et al. | |
| 2010/0037764 A1 | 2/2010 | Hemery | |
| 2010/0269690 A1 | 10/2010 | Lanquetot et al. | |
| 2011/0036195 A1 * | 2/2011 | Bruder | F16H 59/042 74/473.33 |

FOREIGN PATENT DOCUMENTS

| | | |
|---|---|---|
| CN | 101795911 A | 8/2010 |
| CN | 101994827 A | 3/2011 |
| CN | 102410322 A | 4/2012 |
| DE | 10 2007 008 730 A1 | 8/2008 |
| DE | 10 2007 041 769 A1 | 3/2009 |
| EP | 0 740 085 B1 | 9/2000 |
| EP | 2 353 954 A1 | 8/2011 |
| FR | 2 128 048 | 10/1972 |
| FR | 2 259 288 A1 | 8/1975 |
| WO | WO 97/07322 A1 | 2/1997 |
| WO | WO 02/44004 A1 | 6/2002 |
| WO | WO 2008/027019 A1 | 3/2008 |
| WO | WO 2008/027020 A1 | 3/2008 |
| WO | WO 2010/031512 A1 | 3/2010 |

OTHER PUBLICATIONS

International Search Report (PCT/ISA/210) issued in PCT Application No. PCT/EP2014/078627 dated Mar. 17, 2015, with English translation (eight (8) pages).

German Office Action issued in counterpart German Application No. 10 2013 114 897.2 dated Nov. 18, 2014 (five (5) pages).

Chinese-language Office Action issued in counterpart Chinese Application No. 201480075421.9 dated Jan. 31, 2018 with English translation (Eleven (11) pages).

\* cited by examiner

SPRING BRAKE CYLINDER WITH EMERGENCY RELEASE DEVICE

CROSS REFERENCE TO RELATED APPLICATIONS

This application is a continuation of PCT International Application No. PCT/EP2014/078627, filed Dec. 19, 2014, which claims priority under 35 U.S.C. § 119 from German Patent Application No. 10 2013 114 897.2, filed Dec. 27, 2013, the entire disclosures of which are herein expressly incorporated by reference.

BACKGROUND AND SUMMARY OF THE INVENTION

The invention relates to a pneumatic spring brake cylinder for vehicle brake systems. The spring brake cylinder has a housing, in which a spring brake piston which is loaded by way of at least one accumulator spring and is connected to a spring brake piston tube is guided movably, and has an emergency release device for emergency releasing of the spring brake piston if the pressure fails. The emergency release device contains a spindle which can be rotated with respect to the spring brake cylinder and can be screwed into a nut which is held fixedly in the spring brake piston tube so as to rotate with it by way of a positively locking connection and interacts with an axial stop on the spring brake piston, in order to cause a releasing movement of the spring brake piston counter to the action of the at least one accumulator spring.

A spring brake cylinder of this type usually has a housing, in which a spring brake piston is guided. The piston divides the interior of the housing into a spring accumulator chamber and a pressure space. A spring device which prestresses the spring brake piston in the direction of the pressure space is arranged in the spring accumulator chamber. In order that a parked or braked vehicle, in which the spring brake cylinder is arranged, can be moved, the pressure space is loaded with compressed air in such a way that the spring brake piston is displaced counter to the prestressing action of the accumulator spring. As a result, a brake device which is coupled to the spring brake piston is disengaged from a brake disk, with the result that the vehicle is no longer braked. For brake actuations during driving, a spring brake cylinder of this type can be coupled in a known way to a service brake cylinder in the form of what is known as a combined cylinder.

In the case of combined service brake and spring brake cylinders (combined cylinders), in the parking brake case the spring brake piston actuates a service brake piston of the service brake cylinder by way of its spring brake piston tube. The service brake piston in turn has a service brake piston rod which interacts with a brake mechanism of the vehicle brake, in particular a disc brake. A brake mechanism of this type is described, for example, in EP 0 740 085 B1 and has a pivoting lever which is connected in an articulated manner to the service brake piston rod and is connected fixedly to a brake application shaft so as to rotate with it. The brake application shaft is provided with a cam contour which, upon a rotation of the brake application shaft about its longitudinal axis, leads to an axial relative movement of a brake caliper and a brake pad of a disc brake.

If a substantial reduction in the air pressure in the pressure space then occurs on account of a pressure failure in the system, the spring brake piston is displaced in the direction of the pressure space on account of the prestress of the accumulator spring, in such a way that the brake device which is coupled to the spring brake piston acts and performs a braking operation of the vehicle. In this way, for example in the case of a line rupture of the brake pressure line during driving, it is to be reliably prevented that a commercial vehicle continues to drive in an unbraked manner and therefore becomes difficult to control.

This enforced braking operation in the case of a deficient compressed air feed is additionally also utilized in the case of trailers, etc., which have been parked for a relatively long time, in order that it can be prevented that said vehicles roll away unintentionally.

The braking action which is exerted in this way in cases of this type by way of the mechanical accumulator spring in the spring brake cylinder is to be capable of being released again, however, for example in order to displace parked vehicles or to clear a driving lane which is blocked on account of a breakdown, in order that the relevant vehicles can be moved and, for example, traffic obstacles can be eliminated.

Since the existing compressed air supply is sometimes damaged here, however, as a result of line rupture, etc. and cannot be used, and there is also no supplementary compressed air supply, it is necessary in practice that spring brake cylinders of this type have a mechanical emergency release device. The latter is usually provided with an actuating device in the form of a threaded spindle which is accessible from outside and can be actuated in a rotatable manner. The threaded spindle is held such that it can be rotated or screwed in a bush in the bottom of the spring brake cylinder and interacts, as described in WO 97/07322 A1 which forms the generic type, with a nut which is held fixedly in the spring brake piston tube so as to rotate with it. The result is that a rotation of the threaded spindle brings about a linear displacement of the nut on the threaded spindle.

Here, in this specific embodiment, the outwardly pointing end of the spring brake piston tube is provided with an inwardly protruding flange which acts as a stop for the nut. On account of the linear offset, which is introduced by way of the rotational movement of the threaded spindle, of the threaded spindle which is screwed on the nut in the axial direction, the nut comes into contact with the flange of the spring brake piston tube, a likewise linear displacement of the spring brake piston counter to the prestressing force of the accumulator spring occurring as a result of the further rotation of the threaded spindle. The result is that the brake device which interacts with the spring brake piston can be emergency released as a result.

As shown in FIG. 2 of WO 97/07322 A1, the nut is held fixedly in the spring brake piston tube so as to rotate with it by way of a positively locking connection, an external polygonal profile which runs around in the circumferential direction on the outer circumference of the nut, in particular a hexagonal profile, and a hexagonal profile of complementary configuration on the inner circumference of the spring brake piston tube, interacting in a positively locking manner.

This design has proven itself in practice with regard to its functionality. It has the disadvantage, however, that a sliding movement of the internal hexagonal profile of the spring brake piston tube with respect to the external hexagonal profile of the nut occurs in the case of each application of the spring brake which is induced by way of venting of the pressure space. Because the materials of the nut and the spring brake piston tube are not selected as a rule with regard to their sliding wear properties, material abrasion can occur in the case of a sliding movement of this type, it being possible for shavings to pass into the compressed air system and damage it.

In the case of a combined service and spring brake piston which is known from WO 2010/031512 A1, the nut of the mechanical emergency release device is held in a rotationally fixed manner by way of an intermediate bush which is arranged between the inner wall of the spring brake piston tube and the outer circumference of the nut. The intermediate bush is fixed in a rotationally fixed manner in a cutout of the spring brake piston rod by way of a radially outwardly pointing lug which is configured at its end which points toward the bottom of the spring brake cylinder. The lug, together with the cutout as anti-rotation safeguard, takes up a relatively large amount of installation space axially and radially, however.

In contrast, the present invention is based on the object of developing a spring brake cylinder of the type mentioned at the outset, in such a way that the above-described disadvantages are avoided.

This and other objects are achieved in accordance with embodiments of the invention.

The invention provides that the positively locking connection is formed firstly between an external polygonal profile which runs around in the circumferential direction on the outer circumference of the nut and a circumferential internal polygonal profile of complementary configuration on the inner circumference of an intermediate bush and, secondly, by way of an external polygonal profile which runs around in the circumferential direction on the outer circumference of the intermediate bush and a circumferential internal polygonal profile of complementary configuration on the inner circumference of the spring brake piston tube.

A polygonal profile is to be understood to mean an external or internal profile which, as viewed in cross section, has a plurality of corners or edges which are connected to one another by way of any desired surfaces, in particular straight, convex or concave surfaces.

As a result, firstly the material of the intermediate bush can be selected in such a way that the wear on account of a relative sliding movement of the spring brake piston tube with respect to the nut is reduced. The intermediate bush preferably consists of polyamide, in particular of glass fiber-reinforced polyamide, which has satisfactory sliding properties and high stiffness and strength on account of the relatively high torsional and shear loading which is introduced by way of the nut which is held in a rotationally fixed manner. As an alternative, the intermediate bush might also consist of a metal.

In contrast, the materials of the spring brake piston tube or the spring brake piston and/or the nut can be selected independently thereof with regard to other requirements, such as with regard to stiffness or weight.

Secondly, the positively locking connection between the nut and the spring brake piston tube by means of two polygonal profiles makes an extremely space-saving arrangement possible because polygonal profiles of this type, above all in the case of a relatively large number of edges, substantially enclose a cylindrical circumference and extend only slightly in the radial direction as a result. As a result, the wall thickness of the spring brake piston tube can be kept comparatively small.

The threaded spindle particularly preferably has an external thread which interacts with an internal thread of a through bore which is configured in a bottom of the housing, in order to screw the threaded spindle into and out of the housing. To this end, for example, a bush with an internal thread can be held in the bottom of the housing.

As an alternative, the threaded spindle might also, however, be held in a merely rotatable but axially fixed manner in the bottom of the housing. A solution of this type is described in WO 97/07322 A1 which was cited at the outset. Then, a rotation of the threaded spindle likewise causes screwing of the nut which is held in a rotationally fixed manner and therefore the axial movement of the nut.

The external polygonal profile which extends in the circumferential direction on the outer circumference of the intermediate bush and the circumferential internal polygonal profile of complementary configuration on the inner circumference of the spring brake piston tube are particularly preferably formed by way of a double-hex profile. As a result of the relatively high number of twelve edges, the radial extent of the profile is relatively small, which, as has already been mentioned above, has a positive effect on the installation space.

In particular, the double-hex profile can be configured in one piece with the spring brake piston tube. This is advantageous, above all, if the spring brake piston tube is configured in one piece with the spring brake piston and represents an injection molded product, for example made from plastic or aluminum. The double-hex profile can then be primary formed together with the spring brake piston/spring brake piston tube.

According to one development, the external polygonal profile which extends in the circumferential direction on the outer circumference of the nut and the circumferential internal polygonal profile of complementary configuration on the inner circumference of the intermediate bush can be formed by way of a hexagonal profile. Then, for example, a commercially available nut with an external hexagonal profile can be used.

The intermediate bush can be held in an axially fixed manner in the spring brake piston tube, for example between two axial stops, of which one stop is formed by way of a shoulder which extends radially to the inside from an inner wall of the spring brake piston tube and a further stop is formed by way of a disk which is fixed in the spring brake piston tube. In particular, the intermediate bush has at least an axial length which corresponds to the maximum relative movement between the nut and the spring brake piston tube, in order that the nut is held in a rotationally fixed manner in every position and/or in every screwing state. In other words, the intermediate bush has at least an axial length which corresponds to the axial screwing region of the nut on the threaded spindle.

The external polygonal profile which extends in the circumferential direction on the outer circumference of the intermediate bush and the circumferential internal polygonal profile of complementary configuration on the inner circumference of the spring brake piston tube particularly preferably extend substantially over the entire axial length of the intermediate bush. Then, the torsional moment and/or shear moment which act/acts on the intermediate bush from the nut can be supported over a relatively large length.

The axial stop for the nut is particularly preferably formed by way of a disk which is held in the spring brake piston tube. As an alternative, the axial stop for the nut might also be configured in one piece directly on the spring brake piston tube, for example by virtue of the fact that a shoulder which extends radially to the inside from the inner wall of the spring brake piston tube is configured on the spring brake piston tube, which shoulder then forms the axial stop for the nut.

The invention also relates to a combined service brake and spring brake cylinder for brake systems of vehicles, having the above-described spring brake cylinder.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
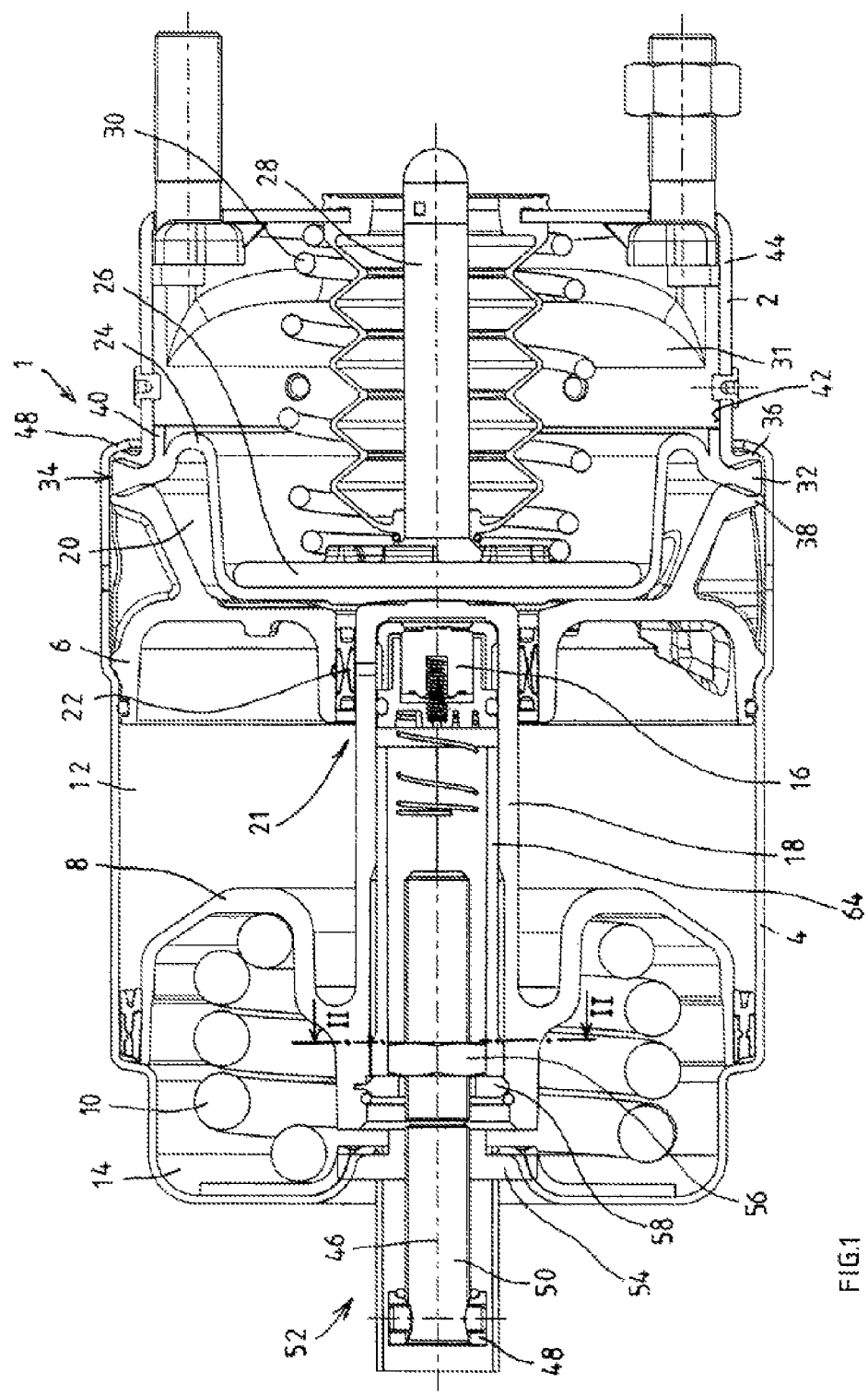
FIG. 1 is a cross-sectional illustration of a combined service brake and spring brake cylinder having an emergency release apparatus according to one preferred embodiment of the invention.

FIG. 1 shows a combined service brake and spring brake cylinder 1, called a combined cylinder in the following text. The combined cylinder 1 consists of a service brake cylinder 2 and a spring brake cylinder 4 which is connected to the former structurally and functionally. The service brake cylinder 2 and the spring brake cylinder 4 are separated from one another by way of an intermediate wall 6. A spring brake piston 8 is arranged displaceably within the spring brake cylinder 4, an accumulator spring 10 bearing against a side of the spring brake piston 8. The accumulator spring 10 is supported on its opposite side on the bottom of the spring brake cylinder 4. A spring brake chamber 12 is configured between the spring brake piston 8 and the intermediate wall 6, which spring brake chamber 12 is connected to a pressure regulating module (not shown for reasons of scale), in order to aerate and to vent it. Upon aeration, the spring brake piston 8 is displaced axially into the release position of the parking brake with stressing of the accumulator spring 10. During said displacement of the spring brake piston 8, the air which prevails within the spring chamber 14 which receives the accumulator spring 10 is pressed out via a venting valve 16. If, in contrast, the spring brake chamber 12 is vented for the purpose of braking, the accumulator spring 10 is capable of displacing the spring brake piston 8 into the brake application position.

The spring brake piston 8 is connected to a hollow spring brake piston tube 18 which extends through the intermediate wall 6 into a service brake chamber 20 of the service brake cylinder 2. The spring brake piston 8 can be configured in one piece with the spring brake piston tube 18 as shown here, or else the spring brake piston 8 and the spring brake piston tube 18 are separate parts which are connected to one another. The spring brake piston 8 itself can also be configured in multiple pieces.

In the embodiment of FIG. 1, the spring brake piston tube 18 is closed with respect to the service brake cylinder 2 by way of a bottom which is configured in one piece with the spring brake piston tube 18. As an alternative, the spring brake piston tube 18 might also be open toward the service brake cylinder 2, and the bottom of the spring brake piston tube 18 might be formed by way of a cover which is placed on it there.

A seal arrangement 22 which is inserted into a central bore 21 of the intermediate wall 6 seals with respect to the outer wall of the spring brake piston tube 18 during its longitudinal movement. An inlet (not shown) opens into the service brake chamber 20, via which inlet compressed air is fed in and discharged in order to actuate the service brake cylinder 2. The compressed air acts on a diaphragm 24 which is inserted within the service brake cylinder 2 and on the opposite side of which a pressure piece in the form of a rigid diaphragm plate 26 is provided. More precisely, the diaphragm 24 separates the service brake chamber 20 of the service brake cylinder 2 which can be loaded with and relieved of pressure medium from a spring chamber 31 which receives a return spring 30 which is supported on the diaphragm plate 26.

The diaphragm plate 26 is connected to a push rod 28 which interacts with a brake actuating mechanism outside the combined cylinder 1. Here, this can be, for example, actuating elements of a disc brake of a motor vehicle. The service brake cylinder 2 is an active brake cylinder, that is to say the service brake is applied by way of aerating of the service brake chamber 20 and is released by way of venting. The return spring 30 which is supported on one side on the diaphragm plate 26 and on the other side on the bottom of the service brake cylinder 2 ensures that the push rod 28 is returned into the release position when the service brake chamber 20 is vented.

A radially outer fastening edge 32 of the diaphragm 24 has a wedge-shaped cross section which tapers radially toward the inside. The radially outer fastening edge 32 of the diaphragm 24 with the wedge-shaped cross section which tapers radially toward the inside is clamped into a receptacle 34 of complementary shape with a wedge-shaped cross section which widens radially toward the outside between the intermediate wall 6 and the service brake cylinder 2. The intermediate wall 6 and the service brake cylinder 2 form their outer edges as flanges 36, 38 which are bent away radially to the outside and the inner faces of which, which point counter to one another, form the receptacle 34 with a wedge-shaped cross section between them.

Furthermore, at least one centering ring 40 which extends in the axial direction and is arranged offset radially toward the inside in relation to the fastening edge 32 is configured on the diaphragm 24, by way of which centering ring 40 the diaphragm 24 can be centered against a radially inner circumferential face 42 of a wall 44 of the service brake cylinder 2. The centering ring 40 is particularly preferably arranged substantially perpendicularly with respect to a center plane of the fastening edge 32 and protrudes, for example, on one side away from the diaphragm 24. It is also contemplated, however, that a further centering ring which protrudes in the direction of the spring brake cylinder 4 and centers the wall thereof against the radially inner circumferential face is provided instead of or in addition to the one centering ring 40.

For weight reasons, the housings of the service brake cylinder 2 and of the spring brake cylinder 4 consist, for example, of aluminum, whereas the intermediate wall 6 is manufactured, for example, from plastic.

A threaded spindle 50 of an emergency release apparatus 52 can be screwed via a tool attachment face 48, for example an external hexagon of a hexagonal nut, with respect to the housing of the spring brake cylinder 4. To this end, the hexagonal nut 48 is connected fixedly to one end of the threaded spindle 50 so as to rotate with it.

An annular insert in the form of a bush 54 is held in a through opening of the housing of the spring brake cylinder housing 4, the central bore of which bush 54 is provided here, for example, with an internal thread, in which an external thread which is present on the outer circumference of the threaded spindle 50 can be screwed in such a way that the threaded spindle 50 can be screwed into or out of the housing of the spring brake cylinder 4.

As an alternative, the threaded spindle 50 might also be held in a merely rotatable and un-screwable but axially fixed manner in the bush 54 or in the bottom of the spring brake cylinder housing 4, with the result that its axial position in relation to the bush 54 or in relation to the spring brake cylinder housing 4 does not change even in the case of rotation. In the engagement region of the threaded spindle 50 with the bush 54, the threaded spindle 50 and the bush 54 then do not have any interacting thread turns, but rather means for axially fixed but rotatable mounting of the threaded spindle 50 with respect to the bush 54 or with respect to the spring brake cylinder housing 4.

In the present case, the spring brake is preferably emergency released manually by way of the threaded spindle 50 being screwed out. To this end, a rotational movement, for example in the counterclockwise direction, is introduced via a screwing tool into the hexagonal nut 48 which is connected fixedly to the threaded spindle 50 so as to rotate with it, as a result of which the accumulator spring 10 of the spring brake is compressed and the spring brake is released.

To this end, the threaded spindle 50 can be screwed in a nut 56 which is held fixedly in the spring brake piston tube 18 by way of a positively locking connection so as to rotate with it, which nut 56 interacts with an axial stop 58 on the spring brake piston 8 or on the spring brake piston rod 18, in order to bring about a release movement of the spring brake piston 8 counter to the action of the accumulator spring 10.

Here, the stop is formed, for example, by way of a disk 58 which is fixed in the spring brake piston tube, for example, by way of a circlip and against which the nut 56 abuts and, as a result, can move the spring brake piston 8 into the release position in the case of further rotation of the threaded spindle 50, as shown in FIG. 1. This arrangement is suitable in the exemplary embodiment of FIG. 1.

In the above-described alternative embodiment, in which the spring brake piston tube 18 is first of all open toward the service brake cylinder 2 and is then closed by way of a cover, the axial stop can also be formed by way of a shoulder which projects inward from the internal diameter of the spring brake piston tube 18 and is formed integrally on the spring brake piston tube 18.

Figure 2:
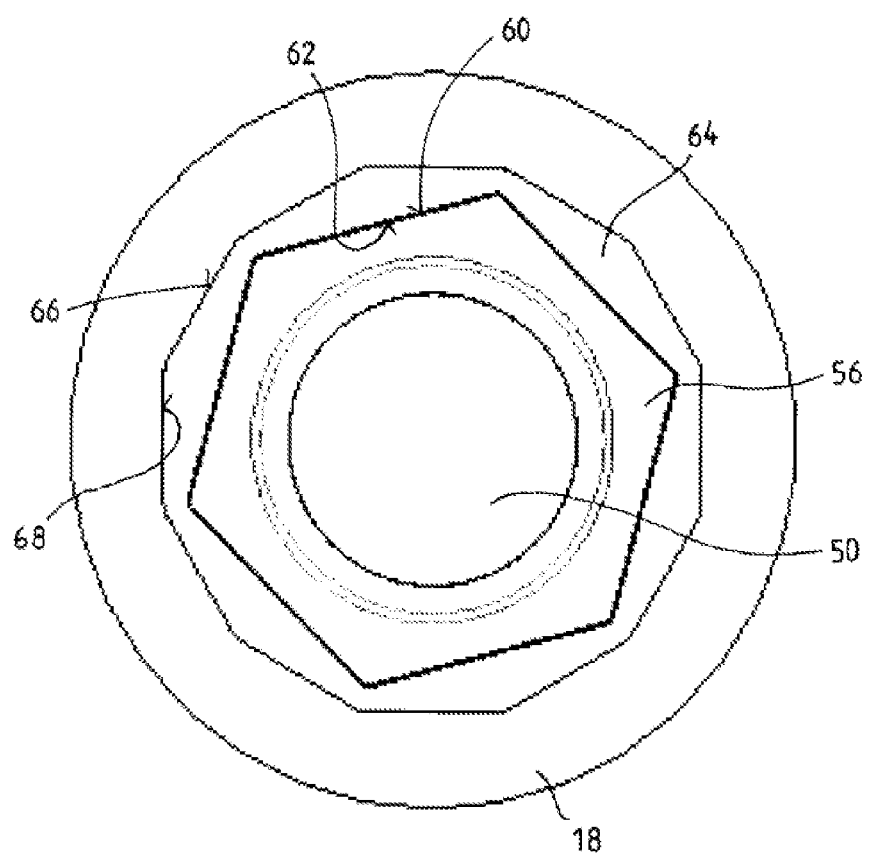
FIG. 2 is a cross-sectional illustration along the line II-II from FIG. 1.

The nut 56 is held fixedly in the spring brake piston tube 18 by way of a positively locking connection so as to rotate with it. As FIG. 2 shows, the positively locking connection for rotational securing of the nut 56 within the spring brake piston tube 18 is formed firstly between an external polygonal profile which extends in the circumferential direction on the outer circumference of the nut 56 and a circumferential internal polygonal profile 62 of complementary configuration on the inner circumference of an intermediate bush 64 and, secondly, by way of an external polygonal profile 66 which runs around in the circumferential direction on the outer circumference of the intermediate bush 64 and a circumferential internal polygonal profile 68 of complementary configuration on the inner circumference of the spring brake piston tube 18. At least in the axial screwing region of the nut 56 on the threaded spindle 50, the intermediate bush 64 is arranged radially between the spring brake piston tube 18 and the nut 56. In other words, the intermediate bush 64 has at least an axial length which corresponds to the axial screwing region of the nut 56 on the threaded spindle 50.

Figure 3:
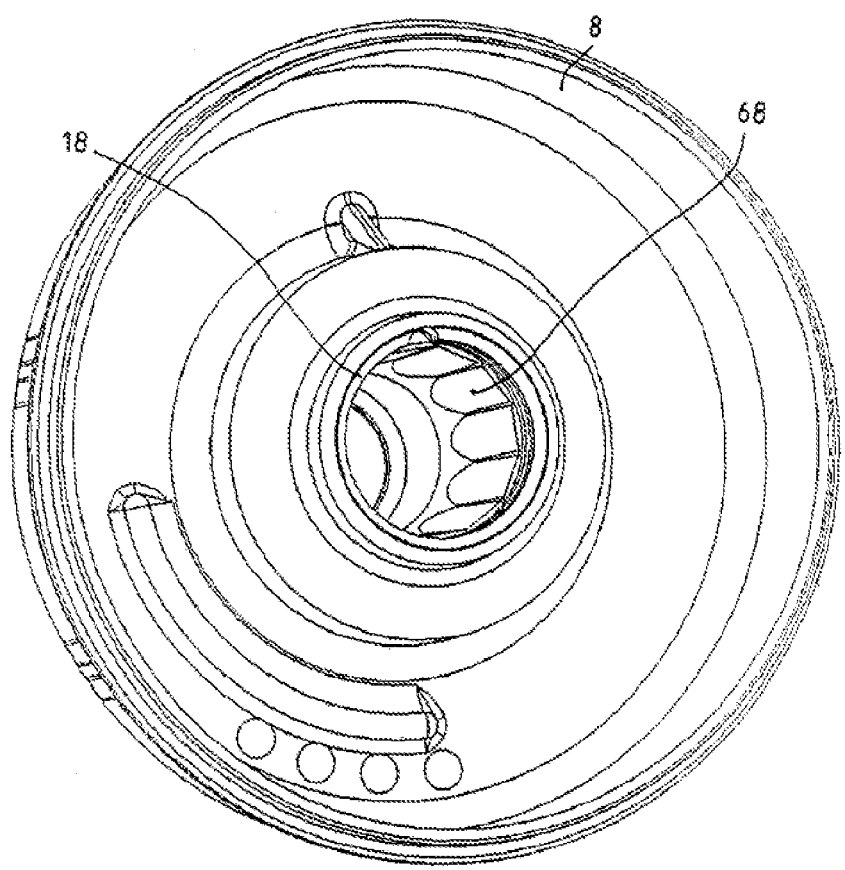
FIG. 3 is a perspective view of the spring brake piston with piston tube of the combined service brake and spring brake cylinder of FIG. 1, as viewed from the left there.

The external polygonal profile 66 which extends in the circumferential direction on the outer circumference of the intermediate bush 64 and the circumferential internal polygonal profile 68 of complementary configuration on the inner circumference of the spring brake piston tube 18 are particularly preferably formed by way of a double-hex profile. In particular, the double-hex profile 68 is configured in one piece with the spring brake piston tube 18, as is apparent from the individual illustration of the spring brake piston 18 of FIG. 3. This perspective view shows the spring brake piston 8 together with the spring brake piston tube 18 as viewed from the left in relation to FIG. 1, that is to say from the bottom of the spring brake cylinder 4 or of the bush 54 which is held there. Here, the spring brake piston tube 18 is, for example, configured in one piece with the spring brake piston 8.

Furthermore, the external polygonal profile 60 which runs around in the circumferential direction on the outer circumference of the nut 56 and the circumferential internal polygonal profile 62 of complementary configuration on the inner circumference of the intermediate bush are formed, for example, by way of a hexagonal profile.

The intermediate bush 64 which preferably consists of plastic, such as polyamide, is held in an axially fixed manner in the spring brake piston tube 18, here, for example, between the disk 58 which also forms the axial stop for the nut 56 and the venting valve 16 on the bottom of the spring brake piston tube 18. The intermediate bush 64 has at least an axial length which is at least as long as the maximum relative movement between the nut 56 and the spring brake piston tube 18 or as the axial screwing region of the nut 56 on the threaded spindle 50, in order that the nut 56 can be held in a rotationally fixed manner on the threaded spindle 50 in every position or in every screwing position.

LIST OF DESIGNATIONS

1 Service brake and spring force accumulator
2 Service brake cylinder
4 Spring brake cylinder
6 Intermediate wall
8 Spring brake piston
10 Accumulator spring
12 Spring brake chamber
14 Spring chamber
16 Venting valve
18 Spring brake piston tube
20 Service brake chamber
21 Bore
22 Seal arrangement
24 Diaphragm
26 Diaphragm plate
28 Push rod
30 Return spring
31 Spring chamber
32 Fastening edge
34 Receptacle
36 Flange
38 Flange
40 Centering ring
42 Radially inner circumferential face
44 Wall
46 Cylinder axis
48 Tool attachment face
50 Threaded spindle
52 Emergency release device
54 Bush 56 Nut
58 Stop
60 External polygonal profile
62 Internal polygonal profile
64 Intermediate bush
66 External polygonal profile
68 Internal polygonal profile The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatic spring brake cylinder for a vehicle brake system, comprising:
   a housing;
   a spring brake piston guided movably in the housing, the spring brake piston being loaded via an accumulator spring and being connected to a spring brake piston tube;
   an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
   wherein
      the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube,
      the spindle of the emergency release device is a threaded spindle having an external thread, and
      the external thread interacts with an internal thread of a through bore configured in a bottom of the housing of the spring brake cylinder in order to screw the threaded spindle into and out of the housing.

2. The spring brake cylinder according to claim 1, wherein the intermediate bush is made of polyamide.

3. The spring brake cylinder according to claim 2, wherein the polyamide is a glass fiber-reinforced polyamide.

4. The spring brake cylinder according to claim 1, wherein:
   the external polygonal profile which extends in the circumferential direction on the outer circumference of the nut and the circumferential internal polygonal profile of complementary configuration on the inner circumference of the intermediate bush are each formed with a hexagonal profile.

5. The spring brake cylinder according to claim 1, wherein the intermediate bush is held in an axially fixed manner in the spring brake piston tube.

6. The spring brake cylinder according to claim 1, wherein the intermediate bush has an axial length which corresponds to an axial screwing region of the nut on the spindle.

7. The spring brake cylinder according to claim 1, wherein the axial stop for the nut is formed by way of a disk which is held in the spring brake piston tube.

8. The spring brake cylinder according to claim 1, wherein the axial stop for the nut is configured in one piece on the spring brake piston tube.

9. A pneumatic spring brake cylinder for a vehicle brake system, comprising:
   a housing;
   a spring brake piston guided movably in the housing, the spring brake piston being loaded via an accumulator spring and being connected to a spring brake piston tube;
   an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
   wherein
      the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube, and
      the external polygonal profile which extends in the circumferential direction on the outer circumference of the intermediate bush and the circumferential internal polygonal profile of complementary configuration on the interior circumference of the spring brake piston tube are each formed with a double-hex profile.

10. The spring brake cylinder according to claim 9, wherein the double-hex profile is configured in one piece with the spring brake piston tube.

11. A pneumatic spring brake cylinder for a vehicle brake system, comprising:
   a housing;
   a spring brake piston guided movably in the housing, the spring brake piston being loaded via an accumulator spring and being connected to a spring brake piston tube;
   an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
   wherein the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube, and the external polygonal profile which extends in the circumferential direction on the outer circumference of the intermediate bush and the circumferential internal polygonal profile of complementary configuration on the inner circumference of the spring brake piston tube extend substantially over an entire axial length of the intermediate bush.

12. A combined service brake and spring brake cylinder for a brake system of a vehicle, comprising:
a service brake cylinder; and
a spring brake cylinder, the spring brake cylinder comprising:
a housing;
a spring brake piston guided movably in the housing, the spring brake piston being loaded via an accumulator spring and being connected to a spring brake piston tube;
an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
wherein
the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube,
the spindle of the emergency release device is a threaded spindle having an external thread, and
the external thread interacts with an internal thread of a through bore configured in a bottom of the housing of the spring brake cylinder in order to screw the threaded spindle into and out of the housing.

13. A combined service brake and spring brake cylinder for a vehicle brake system, comprising:
a housing;
a spring brake piston guided movably in the housing, the spring brake piston being loaded via an accumulator spring and being connected to a spring brake piston tube;
an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
wherein
the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube, and
the external polygonal profile which extends in the circumferential direction on the outer circumference of the intermediate bush and the circumferential internal polygonal profile of complementary configuration on the interior circumference of the spring brake piston tube are each formed with a double-hex profile.

14. A combined service brake and spring brake cylinder for a vehicle brake system, comprising:
a housing;
a spring brake piston guided movably in the housing, the spring brake piston being loaded via an accumulator spring and being connected to a spring brake piston tube;
an emergency release device configured to release the spring brake piston if pressure fails, the emergency release device comprising a spindle rotatable with respect to the spring brake cylinder and being screwable into a nut held in the spring brake piston tube rotationally fixed relative to the spring brake piston tube via a positive locking connection, the nut interacting with an axial stop on the spring brake piston in order to cause a release movement of the spring brake piston counter to action of the accumulator spring,
wherein
the positive locking connection is formed, first, between an external polygonal profile which extends in a circumferential direction on an outer circumference of the nut and a circumferential internal polygonal profile of complementary configuration on an inner circumference of an intermediate bush and, second, by way of an external polygonal profile which extends in a circumferential direction on an outer circumference of the intermediate bush and a circumferential internal polygonal profile of complementary configuration on an inner circumference of the spring brake piston tube, and
the external polygonal profile which extends in the circumferential direction on the outer circumference of the intermediate bush and the circumferential internal polygonal profile of complementary configuration on the inner circumference of the spring brake piston tube extend substantially over an entire axial length of the intermediate bush.

* * * * *